(12) United States Patent
Osendorfer et al.

(10) Patent No.: US 6,286,869 B1
(45) Date of Patent: Sep. 11, 2001

(54) SEAT BELT SYSTEM FOR A TWO-WHEEL MOTOR VEHICLE

(75) Inventors: Heidi Osendorfer, Taufkirchen/Vils; Michael Fischer, Munich; Stephan Bleicher, Holzhaussiedlung, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/394,896

(22) Filed: Sep. 13, 1999

(30) Foreign Application Priority Data

Sep. 11, 1998 (DE) .............................. 198 41 750

(51) Int. Cl.$^7$ ................................................. B60R 22/48
(52) U.S. Cl. ...................... 280/801.1; 74/501.6; 180/286
(58) Field of Search ................................. 280/801.1, 806, 280/808; 297/468, 486; 74/501.6; 180/268, 286

(56) References Cited

U.S. PATENT DOCUMENTS

| | | | |
|---|---|---|---|
| 3,168,158 | * | 2/1965 | Schoeffler et al. ............... 180/270 |
| 4,028,948 | * | 6/1977 | Frost et al. ........................... 74/2 |
| 4,742,886 | * | 5/1988 | Sato ............................... 180/268 |
| 5,123,673 | * | 6/1992 | Tame .............................. 280/801 |
| 5,275,437 | | 1/1994 | Modinger et al. ............... 280/806 |
| 5,448,928 | * | 9/1995 | Harger ............................. 74/523 |
| 5,676,398 | | 10/1997 | Nurtsch ......................... 280/806 |
| 5,758,546 | * | 6/1998 | Taomo et al. .................. 74/501.6 |

FOREIGN PATENT DOCUMENTS

| | | |
|---|---|---|
| 25 31 490 | 2/1977 | (DE) . |
| 30 18 350 | 11/1981 | (DE) . |
| 3341568 | 5/1985 | (DE) . |
| 195 05 448 | 8/1996 | (DE) . |
| 0820 909 | 7/1997 | (EP) . |

* cited by examiner

Primary Examiner—Daniel G. DePumpo
Assistant Examiner—David R. Dunn
(74) Attorney, Agent, or Firm—Crowell & Moring LLP

(57) ABSTRACT

A seat belt system for a two wheel motor vehicle is arranged for fixing a person on a vehicle seat. Two mutually independent seat belt straps are provided which can be fastened by one belt buckle tongue respectively on one vehicle-fixed belt buckle respectively. By operating one unlatching device respectively on the pertaining belt buckle, one belt buckle tongue respectively can be released from this belt buckle and at least one additional operating device, which interacts with the unlatching devices of both belt buckles, is provided at an easily accessible point on the motor vehicle for releasing both belt buckle tongues from the respective pertaining belt buckle. The unlatching devices of both belt buckles are connected by way of at least one cable pull with the additional operating device. The additional operating device includes a device for the length and/or force compensation, by which the cable pull connection is triggered in that, when the additional operating device is operated, both belt buckles are released, irrespective of whether releasing travels and/or releasing forces of different amounts must in each case be applied for the unlatching devices.

10 Claims, 3 Drawing Sheets

SEAT BELT SYSTEM FOR A TWO-WHEEL MOTOR VEHICLE

BACKGROUND AND SUMMARY OF THE INVENTION

This application claims the priority of German application 198 41 750.0, filed in Germany on Sep. 11, 1998.

The invention relates to a seat belt system for a motor vehicle, particularly for a two-wheeler. Preferred embodiments of the invention relate to a seat belt system for a two wheel motor vehicle for fixing a person on a vehicle seat, having two mutually independent seat belt straps which can be fastened by means of one belt buckle tongue respectively on one vehicle-fixed belt buckle respectively, in which case, by operating one unlatching device respectively on the pertaining belt buckle, one belt buckle tongue respectively can be released from this belt buckle and at least one additional operating device, which interacts with the unlatching devices of both belt buckles, is provided at an easily accessible point on the motor vehicle for releasing both belt buckle tongues from the respective pertaining belt buckle, the unlatching devices of both belt buckles being connected by way of at least one cable pull with the additional operating device.

German Patent Document DE 33 41 568 A1 describes a seat belt buckle with an automatic unlatching mechanism. In addition to its manual unlatching mechanism mounted directly on the buckle body, this seat belt buckle has an automatic unlatching mechanism, in the case of which the manual unlatching system can be triggered by way of a Bowden cable by means of another opening mechanism of a mechanical or electromechanical construction. This additional opening mechanism can also trigger several belt buckles in a remote-controlled manner.

Furthermore, it is known, particularly in the case of a two-wheeler, to use a seat belt system for fastening a person on a vehicle seat, which seat belt system has two mutually independent seat belt straps which can be fixed by means of one belt buckle tongue respectively on one belt buckle respectively which is fixed to the vehicle. By operating one unlatching mechanism respectively on the pertaining belt buckle, one belt buckle tongue respectively can be detached from the belt buckle and at least one additional operating device interacting with the unlatching mechanisms of both belt buckles is provided at an easily accessible point on the motor vehicle for detaching both belt buckle tongues from the respective pertaining belt buckle. The unlatching mechanisms of both belt buckles are connected by way of at least one cable pull with the additional operating device.

However, when the belt buckles are operated by way of an additional operating device by means of cable pulls, under certain circumstances, as a result of not compensating tolerances, only one belt buckle may release the belt buckle tongue. However, its cable pull will then block the operating lever such that the second belt buckle can be released only by means of its unlatching device directly on the belt buckle.

It is therefore an object of the invention to further develop a seat belt system of the above-mentioned time for a motor vehicle such that, as the result of an additional operating device, in each case, both belt buckle tongues of both belt buckles can be released.

According to the invention, this object is achieved by providing a system of the above-noted type wherein the additional operating device comprises a device for the length and/or force compensation operable to trigger the cable pull connection such that when the additional operating device is operated, both belt buckles are released, irrespective of whether releasing travels and/or releasing forces of different amounts must in each case be applied for the unlatching devices.

Further advantageous features of preferred embodiments of the invention are described herein and in the claims.

According to the invention, the additional operating device comprises a device for the length compensation and/or force compensation by means of which the cable pull connection is controlled such that, when the additional operating device is operated, both belt buckles are released, irrespective of whether differently long release paths and/or release forces must in each case be applied for the unlatching devices. Such a device for the length compensation and/or force compensation between two cable pulls, or both ends of one cable pull, advantageously has the result that the available force and/or the available path for releasing both belt buckles can be automatically distributed according to the respective force requirement and/or path requirement of the individual unlatching devices of the belt buckles onto these belt buckles. Thus, if a belt buckle has already been unlatched, the cable pull does not, as a result, block the additional operating device, but a length compensation and/or force compensation to the other cable pull takes place until the belt buckle controlled by this cable pull also releases the belt buckle tongue.

In the case of advantageous embodiments of the invention, the additional operating device comprises an operating lever, as a result of whose deflection a cable pull is moved, of which one end respectively is connected with an unlatching mechanism and which, as a device for the length compensation and/or force compensation, is guided in the additional operating device by way of a roller rotatably disposed in a connection carriage, the connection carriage transmitting the deflection movement of the operating lever to the roller.

The roller thus compensates length and/or force differences during the unlatching of both belt buckles in that the cable pull placed around these belt buckles, as a result of a rolling-off movement, can use its effective length according to the requirement for one belt buckle as well as for the other belt buckle.

According to another advantageous feature of preferred embodiments of the invention, the additional operating device comprises an operating lever, by means of whose deflection two cable pulls are moved, one of which respectively leading from the additional operating device to an unlatching mechanism, and their two unlatching-device-side ends, as a device for the length and/or force compensation in the additional operating device are connected by way of a joint piece which is connected at least swivellably with the operating lever.

If two cable pulls are used for triggering the two belt buckles, these are advantageously mounted for the length compensation and/or force compensation on a hinge piece which, in turn, is swivellably connected with the operating lever. Thus a rocker-type lever system is created which in a simple manner provides each cable pull with the length and/or force which the cable pull requires for opening the belt buckle, even if the other cable pull is already blocked by the open belt buckle.

Certain preferred embodiments of the invention are characterized in that the additional operating device comprises a restoring spring, in which case the connection carriage or the hinge piece are deflected by the operating lever against the force of the restoring spring. Such a restoring spring advantageously has the result that, after the unlatching, the unlatching devices of the belt buckles are set back into their latching position because the additional operating device, also as a result of the restoring spring, is set back into a position which corresponds to that of the latched belt buckles.

In certain preferred embodiments of the invention, another device for the length and/or force compensation is installed between the operating lever and the unlatching devices of the belt buckles. This device consists of at least one element which is elastic with respect to tension, particularly a tension spring. This additional device for the length and/or force compensation has the advantage that the operability can be adjusted to be softer and force peaks are compensated.

Other objects, advantages and novel features of the present invention will become apparent from the following detailed description of the invention when considered in conjunction with the accompanying drawings.

DETAILED DESCRIPTION OF THE INVENTION

Figure 1:
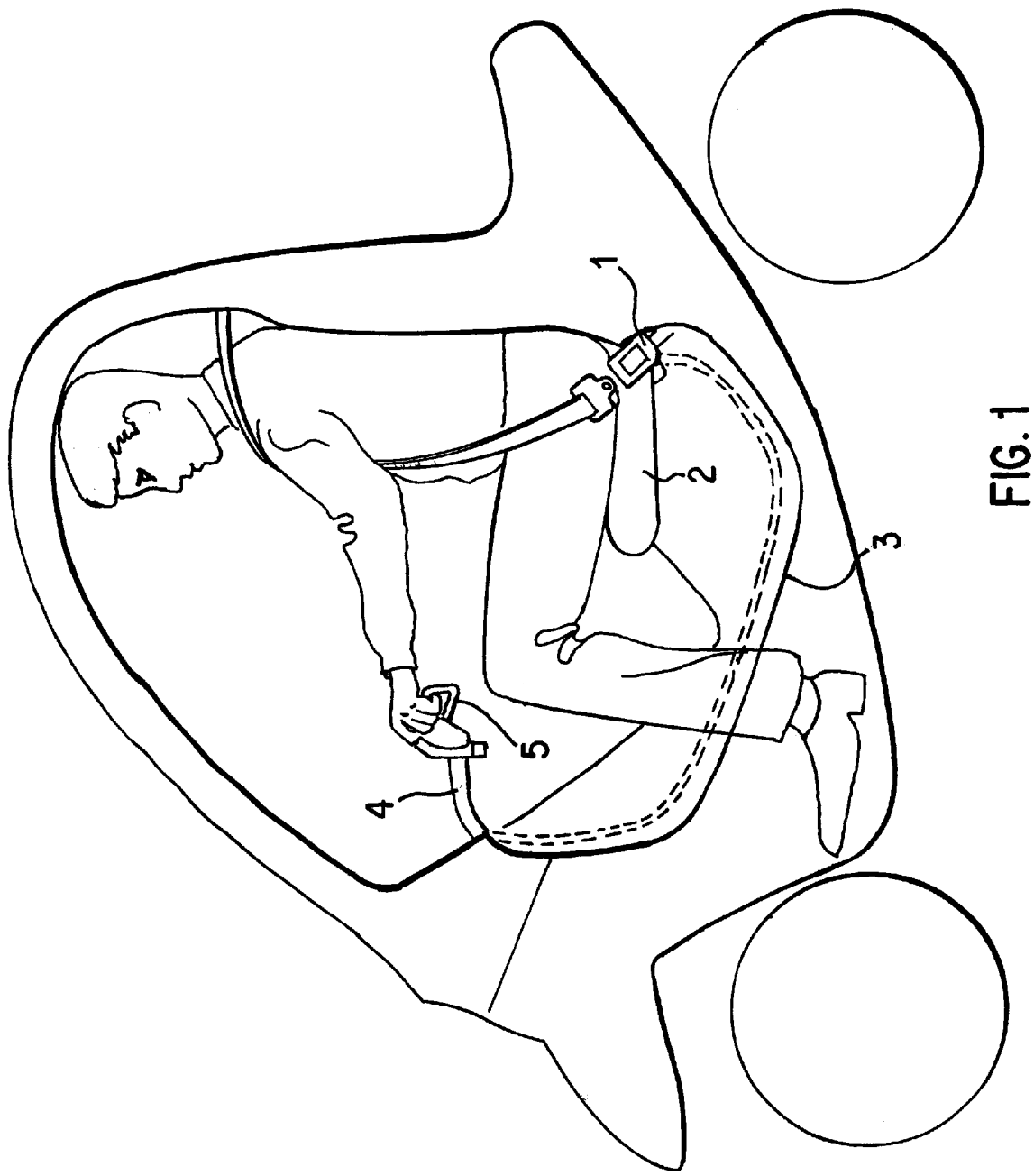
FIG. 1 is a schematic lateral view of a two-wheeler with a seat belt system according to the invention.

FIG. 1 shows a portion of a seat belt system on a two wheeler. Seat belts and their retraction devices are not shown because they are known from prior art, particularly from German Patent Document DE 19 62 878 A1, which shows a two-wheel rider who is fastened on the vehicle seat by means of two seat belts, in which case each seat belt strap can be fastened by way of a belt buckle tongue in one belt buckle respectively on the left and on the right next to the driver's seat. FIG. 1 shows a belt buckle 1 on the left side of a vehicle seat 2 and connected by means of a cable pull 3 with an additional operating device 4 on a steering system of the two-wheeler. The additional operating device has a device for the length and/or force compensation, which is not visible in this figure and which is operated by means of an operating lever 5 by the driver and in the process acts upon the cable pull 3 to the belt buckles 1 to such an extent in which their unlatching devices require force and travel for unlatching the belt buckle tongues. For this purpose, a length and/or force compensation takes place between the two unlatching devices of the belt buckles 1 by way of the additional operating device.

Figure 2:
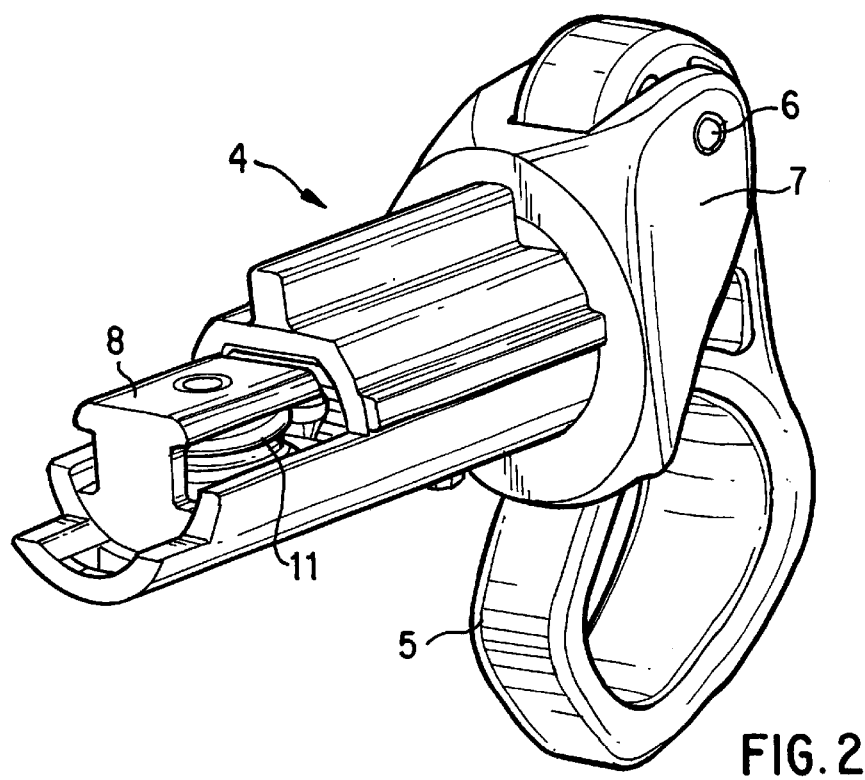
FIG. 2 is a partially sectional spatial representation of an additional operating device for the system of FIG. 1, constructed according to a preferred embodiment of the invention.
Figure 3:
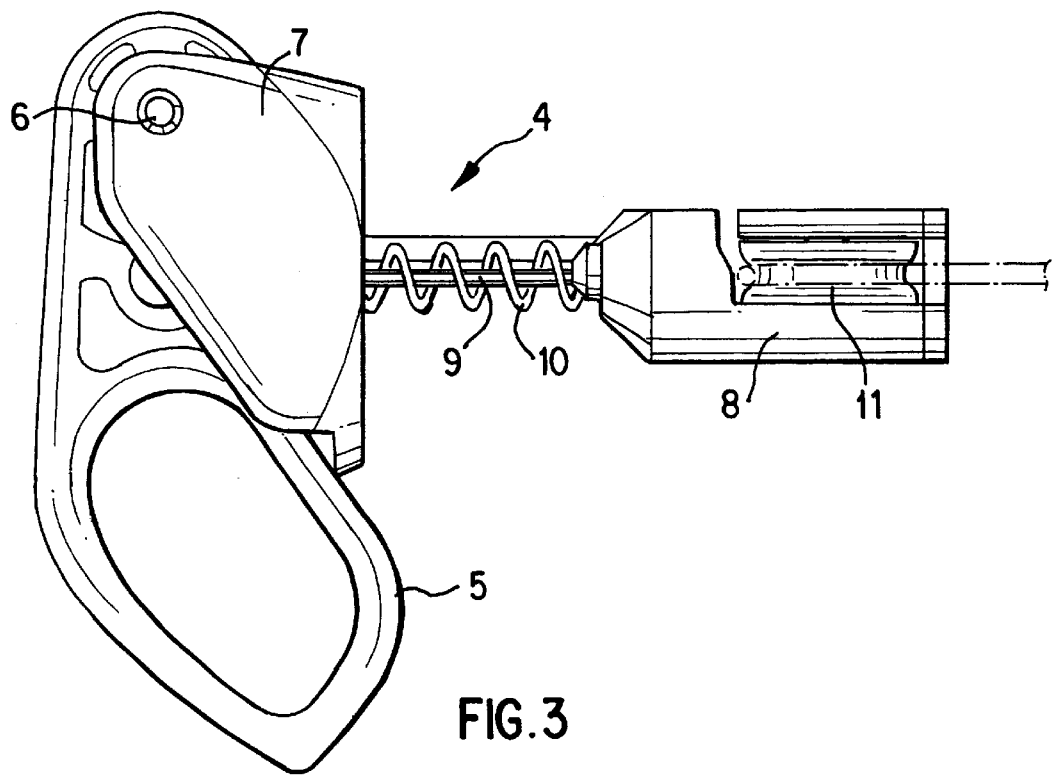
FIG. 3 is also a partially sectional lateral view of the additional operating device of FIG. 2.

FIGS. 2 and 3 show the operating lever 5 of the additional operating device which is swivellable about an axis 6 mounted in a vehicle-fixed manner in a bearing device 7. A connection carriage 8 is disposed in a longitudinally displaceable manner in the bearing device 7, its longitudinal displacement being achieved by the movement of the operating lever 5. For this purpose, the operating lever 5 is connected with the connection carriage 8 by means of an additional cable pull 9, a restoring spring 10 supporting the connection carriage 8 on the bearing device 7. This has the purpose of restoring the connection carriage 8 after its longitudinal movement back into its starting position in which the belt buckles 1 take up their latching position. In this embodiment of the additional operating device 4, a cable pull, which is not shown in these figures and corresponds to the cable pull 3 of FIG. 1, is in each case connected at one of its ends with one belt buckle 1 respectively. The cable pull 3, which is not shown in these figures, is guided around a roller 11 which is rotatably disposed in the connection carriage 8. As a result, it can unlatch both belt buckles 1 by way of the operating lever 5 by the linear movement of the connection carriage 8. The rotatable roller 11 causes the length and/or force compensation between the two ends of the cable pull 3 which is not shown. Specifically, if a belt buckle 1 is already unlatched and blocks the further movement of this end of the cable pull 3, the cable pull 3 rolls off on the roller 11, which therefore rotates, during a further linear movement of the connection carriage 8, which has the result that movement travel and force are still available for unlatching the second belt buckle 1.

Figure 4:
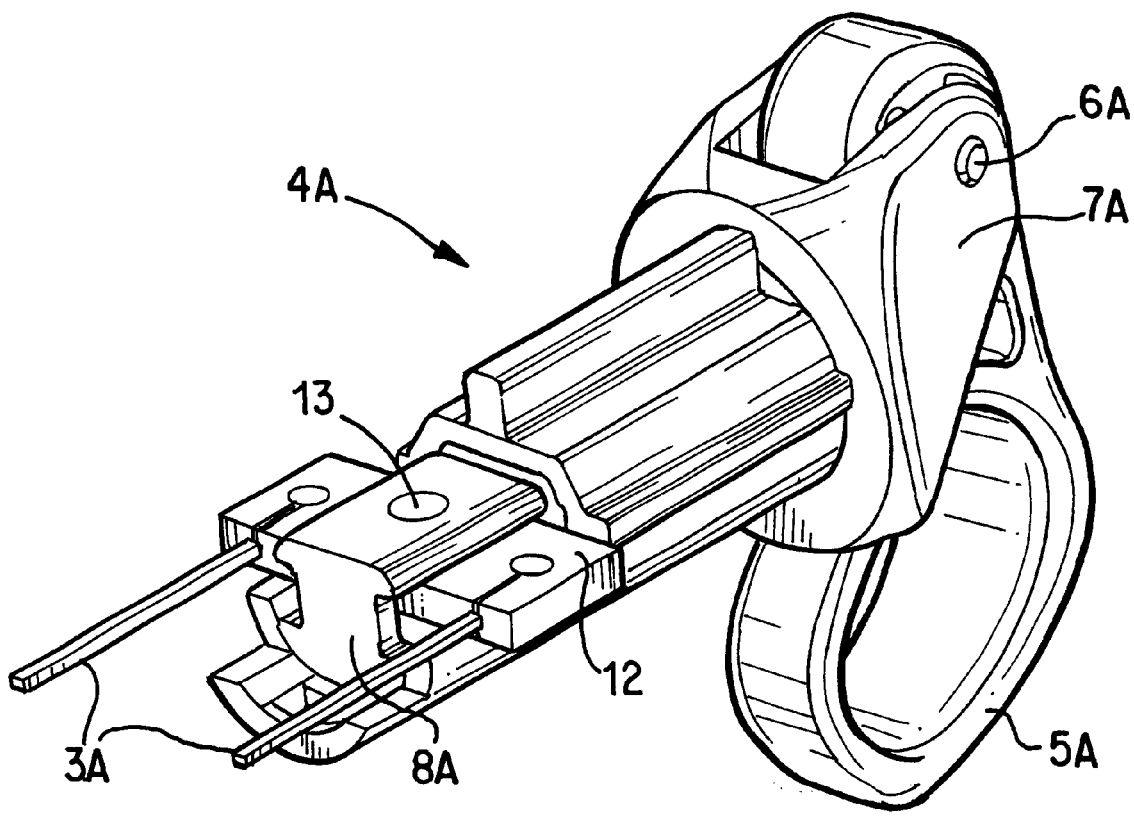
FIG. 4 is a spatial representation with partially sectional views of another embodiment of the additional operating device corresponding to the invention.

FIG. 4 illustrates another method of a length and/or force compensation in the additional operating device 4A. In FIG. 4, similar reference numbers, with a suffix "A" are used to refer to similar features with the same reference number in FIGS. 1–3. Unless otherwise indicated below, the above description for FIGS. 1–3 applies to these similarly numbered features. Here, each unlatching device of the belt buckles 1 is connected by way of one end of the two cable pulls 3A respectively with the additional operating device 4A. For this purpose, the respective other end of the cable pulls 3A is mounted on a hinge piece 12 which, in turn, is swivellable about another axis 13 fastened to the connection carriage 8. As a result, the two cable pulls 3A and thus the unlatching devices of both belt buckles 1 are connected by way of the additional operating device 4A as a result of a length and/or force compensation which in a manner similar to a rocker compensates the different force and travel requirements of the cable pulls 3A. If a cable pull 3A is blocked because the belt buckle 1 controlled by it is already unlatched, during a further linear movement of the connection carriage 8A, the hinge piece 12 rotates about the additional axis 13 and thereby intensifies the force and the travel of the cable pull 3A, whose belt buckle 1 is not yet unlatched, until it is unlatched.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat belt system for a motor vehicle for fixing a person on a vehicle seat, having two mutually independent seat belt straps which each of said straps can be fastened by one respective belt buckle tongue on one respective vehicle-fixed belt buckle, in which case, by operating one respective unlatching device on the pertaining belt buckle, the respective belt buckle tongue can be released from the respective belt buckle, and at least one additional operating device, which interacts with the unlatching devices of both belt buckles, is provided at an easily accessible point on the motor vehicle for releasing both belt buckle tongues from the respective pertaining belt buckle, the unlatching devices of said both belt buckles being connected by way of at least one cable with the additional operating device, wherein the additional operating device comprises a device for at least one of length and force compensation operable to trigger movement of the cable such that when the additional operating device is operated, said both belt buckles are unlatched, irrespective of whether releasing travels or releasing forces of different amounts must be applied for each of the unlatching devices.

2. Seat belt system for a motor vehicle according to claim 1, wherein the additional operating device comprises an operating lever which upon deflection a cable is moved, each end of said cable being connected with one of the respective unlatching devices and wherein the device for the at least one of length compensation and force compensation comprises a roller rotatably disposed in a connection carriage, the connection carriage transmitting the deflection movement of the operating lever to the roller, thereby guiding the cable in the additional operating device via the roller.

3. Seat belt system for a motor vehicle according to claim 2, wherein the additional operating device comprises a restoring spring, the connection carriage being deflected by the operating lever against the force of the restoring spring.

4. Seat belt system for a motor vehicle according to claim 1, wherein the additional operating device comprises an operating lever, which upon deflection two cables are moved, each of said cables leading from the additional operating device to one of the respective unlatching devices and a respective unlatching-device-side end of said cable, the cables being connected by way of a joint piece in the additional operating device as the device for the at least one of length and force compensation, which joint piece is swivellable and can be at least linearly deflected by the operating lever.

5. Seat belt system for a motor vehicle according to claim 4, wherein the additional operating device comprises a restoring spring, the joint piece being deflected by the operating lever against the force of the restoring spring.

6. A seat belt system for a two wheel motor vehicle, comprising:

a vehicle-fixed belt buckle assembly, first and second seat belt straps which have first and second strap belt buckles detachably connectible with the fixed belt buckle assembly, an unlatching assembly including at least one cable which is moved to operate first and second unlatching devices at the fixed belt buckle assembly, and an unlatching control device disposed on the vehicle in a driver accessible position and operable to move the at least one cable to operate the unlatching devices, wherein said unlatching control device includes a cable length compensating mechanism operable to compensate for different cable unlatching paths when said at least one cable is moved to respective unlatching positions of the first and second unlatching devices.

7. A seat belt system according to claim 6, wherein said unlatching control device includes:

a connection carriage containing a rotatable roller around which a portion of the at least one cable pull is wound, a manually operable lever, and an operating member connecting the connection carriage for movement with the lever.

8. A seat belt system according to claim 7, comprising a restoring spring for the connection carriage.

9. A seat belt system according to claim 6, wherein said unlatching control device includes:

a manually operable lever, a joint piece disposed to be moved linearly in response to pivotal movement of the lever, and wherein two of said cables are provided, which cables are connected for movement with the joint piece.

10. A seat belt system according to claim 9, wherein said joint piece is configured to pivot to accommodate different unlatching paths of cables attached thereto when one of said cables becomes blocked.

* * * * *